(12) United States Patent
Rowan et al.

(10) Patent No.: US 6,286,638 B1
(45) Date of Patent: Sep. 11, 2001

(54) ANTI-LOCK BRAKE SENSOR BRACKET

(75) Inventors: Richard R. Rowan, Fort Wayne; Jon H. Mann, Zanesville; Thasin A. Sayeed, Fort Wayne, all of IN (US)

(73) Assignee: International Truck and Engine Corporation, Warrenville, IL (US)

( * ) Notice: Subject to any disclaimer, the term of this patent is extended or adjusted under 35 U.S.C. 154(b) by 0 days.

(21) Appl. No.: 09/619,854

(22) Filed: Jul. 20, 2000

(51) Int. Cl.$^7$ ....................................................... B60T 8/72
(52) U.S. Cl. ......................... 188/181 A; 73/493; 73/494; 248/205.1; 324/173; 324/174; 439/16
(58) Field of Search ......................... 188/181 A; 73/493, 73/494; 248/200, 205.1; 310/168; 324/173, 174, 161, 162; 439/16

(56) References Cited

U.S. PATENT DOCUMENTS

| | | | |
|---|---|---|---|
| 3,812,391 | * 5/1974 | Johnson et al. | 310/168 |
| 3,911,302 | * 10/1975 | DeClaire | 310/168 |
| 4,037,690 | * 7/1977 | Fisher et al. | 188/181 R |
| 4,510,408 | * 4/1985 | Jovick et al. | 310/168 |
| 5,704,692 | * 1/1998 | Purdy et al. | 301/105.1 |
| 5,756,894 | * 5/1998 | Paolo et al. | 73/489 |
| 5,967,473 | * 10/1999 | Singbartl | 248/200 |
| 6,127,819 | * 10/2000 | Ouchi | 324/173 |

* cited by examiner

Primary Examiner—Robert J. Oberleitner
Assistant Examiner—Benjamin A. Pezzlo
(74) Attorney, Agent, or Firm—Jeffrey P. Calfa; Dennis Kelly Sullivan; Gilberto Hernandez

(57) ABSTRACT

An ABS sensor bracket made up of two mounting wing plates engaged to a sensor receiver. The sensor receiver is generally cylindrical and is mounted between the wing plates such that the sensor receiver is asymmetric axially relative to the caliper anchor plate. When viewed from the side, there is a shorter end of the sensor receiver jutting out a shorter distance from the wing plates than an opposite longer end of the sensor receiver. In one embodiment, a first end of the sensor receiver has an outer diameter circumference greater than that of the opposite second end. The caliper anchor plate has an outer edge slot for mounting of the ABS sensor brackets. The outer edge slots are generally 'U' or 'V' shaped. There are mounting holes in the outer radial areas bordering the outer edge slots. The larger diameter circumference of the first end will not allow both of the holes in the wing plates to align with both mounting holes of the outer radial area of the caliper anchor plate at the same time. In the embodiment shown in the figures, the shorter end is the first end that then is the only end of the sensor receiver that will mount facing axially outward from the caliper anchor plate. This of course may be reversed for different ABS wheel sensors, if a different sensor requires its longer end to be outwardly facing to achiever optimum speed sensing of wheel rotation.

17 Claims, 5 Drawing Sheets

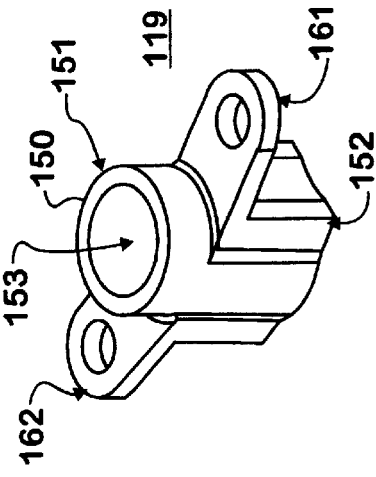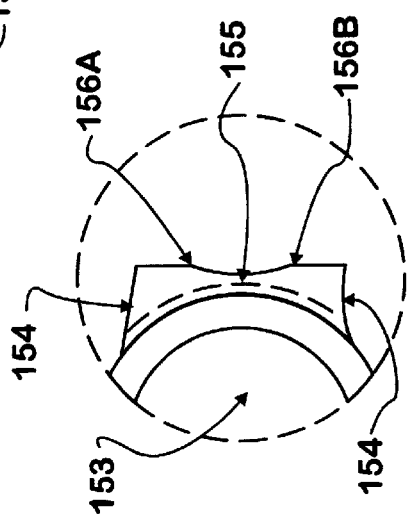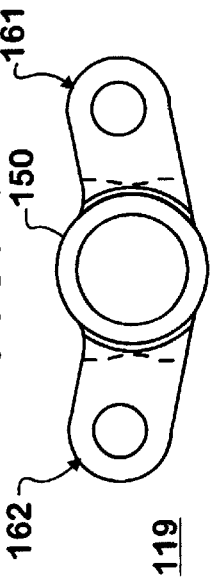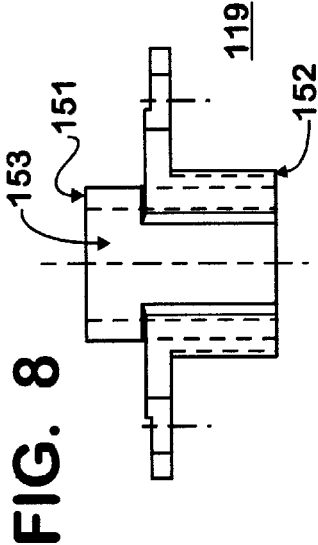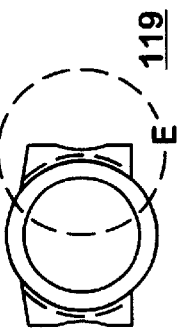

ANTI-LOCK BRAKE SENSOR BRACKET

BACKGROUND

This invention relates to an anti-lock brake wheel sensor bracket, and the bracket in combination with a brake and wheel installation, and a vehicle incorporating the bracket with a brake and wheel installation. The anti-lock brake sensor bracket is configured prevent incorrect installation. Such incorrect or reverse installation could result in inaccurate wheel speed indication, and therefore potentially less than optimum anti-lock brake system performance.

PRIOR ART

Anti-lock sensors detect the speed of wheels on a vehicle feeding this wheel speed information to anti-lock brake (ABS) electronic controllers. The ABS electronic controller uses the wheel speed signals from the sensors to deactivate a particular wheel's brakes or to change the response of the wheel's brakes. The sensors may include magnetic pickups which sense revolution of the wheel due to the radially movement of a reference piece or reference pieces mounted on the wheel. One common type of sensor is generally cylindrical in shape. The cylindrical sensor may be mounted to a caliper anchor plate through a sensor bracket. The caliper anchor plate also supports a brake caliper cylinder for applying brake shoes to slow a wheels motion. The caliper anchor plate is a good location for mounting the ABS sensor and the ABS sensor bracket due to the proximity to the wheel. The accuracy of the ABS sensor is sensitive to the proximity of the sensor to the associated wheel. Other sensor mounting locations in proximity to the associated wheel may be acceptable.

In any case, one version of the ABS sensor bracket 219 contains at least two mounting holes each located along a mounting plate wing, designated 261 and 262. There is a sensor receiver 250, that may be cylindrically shaped, located between the mounting plate wings 261 and 262. This prior art sensor bracket was comprised of two separate metal pieces, one including the mounting plate wings 261 and 262 and one being the sensor receiver 250. The two components were comprised of a metal such as steel and were later welded together. The mounting plate wings along with the ABS sensor receiver are formed along an arc of a radius corresponding to the radius of the caliper anchor plate or other mounting plate mounting location radius. This prior art arrangement and bracket is shown in FIGS. 1 to 4. In order to ensure proper proximity for sensing the ABS sensor must be mounted asymmetrically relative to the caliper mounting plate. Specifically, a shorter side 251 of the ABS sensor must be closer to the wheel than a longer side 252. In the prior art arrangement, the sensor receiver is mounted asymmetrically to the mounting plate wings in order for the ABS sensor to have optimum pickup of wheel speed when mounted. The ABS sensor receiver had a shorter side that was mounted outwards from the caliper mounting plate and the long side inwards relative to the axle or steering knuckle of the vehicle. This is best shown in FIGS. 1 and 4. One condition that may arise in a factory or after market setting during installation of the prior art ABS sensor bracket and ABS sensor is reverse installation. Specifically, the sensor bracket may be installed with the long side of the sensor receiver mounted outwards and the short side mounted inwards relative to the axle or steering knuckle of the vehicle. The respective mounting plate wings may be installed in a reverse fashion to cause this result. The result may result in less than optimum wheel speed sensing and may impact ABS system performance for the vehicle. An ABS sensor mounting bracket and associated ABS system is needed such that generally cylindrical ABS sensors may only be mounted with a short side directed outwards from the caliper mounting plate or other mounting plate relative to the axle or steering knuckle. A durable integrated one piece ABS sensor bracket would be useful to avoid the step of welding the two components together as in the prior art. Additionally, an ABS sensor bracket is needed such that ABS sensors may be mounted asymmetrically to a sensor mounting bracket along an axis parallel to the axles of the vehicle.

SUMMARY

The ABS sensor bracket and an ABS system and vehicle of this invention satisfies an objective of this invention that ABS sensors may be mounted asymmetrically to a sensor mounting bracket along an axis parallel to the axles of the vehicle. Additionally, the ABS sensor bracket of this invention satisfies an objective of this invention such that that generally cylindrical ABS sensors may only be mounted with a short side directed outwards from the caliper mounting plate or other mounting plate relative to the axle or steering knuckle. The ABS sensor bracket and a system an ABS system and vehicle incorporating these brackets satisfy the stated objectives as follows. The sensor bracket of this invention is comprised of two mounting wing plates engaged to a sensor receiver. The sensor receiver is generally cylindrical and is mounted between the wing plates such that the sensor receiver is asymmetric axially relative to the caliper anchor plate. When viewed from the side, there is a shorter end of the sensor receiver jutting out a shorter distance from the wing plates than an opposite longer end of the sensor receiver. In one embodiment, a first end of the sensor receiver has an outer diameter circumference greater than that of the opposite second end. The caliper anchor plate has an outer edge slot for mounting of the ABS sensor brackets. The outer edge slots are generally 'U' or 'V' shaped. There are mounting holes in the outer radial areas bordering the outer edge slots. The larger diameter circumference of the first end will not allow both of the holes in the wing plates to align with both mounting holes of the outer radial area of the caliper anchor plate at the same time. In the embodiment shown in the figures, the shorter end is the first end that then is the only end of the sensor receiver that will mount facing axially outward from the caliper anchor plate. This of course may be reversed for different ABS wheel sensors, if a different sensor requires its longer end to be outwardly facing to achiever optimum speed sensing of wheel rotation.

The ABS sensor bracket of this invention may be made of as an integrated one piece design when made of a durable light weight powdered metal. There will be no need to weld separate components together due to the strength of the powdered metal.

DRAWINGS

Other objects and advantages of the invention will become more apparent upon perusal of the detailed description thereof and upon inspection of the drawings, in which:

FIG. 6 is a perspective view of the ABS speed sensor bracket of the assembly shown in FIG. 5.

FIG. 7 is a top down view of the ABS speed sensor bracket of the assembly shown in FIG. 5.

FIG. 8 is a cut away side view of the ABS speed sensor bracket of the assembly shown in FIG. 5.

FIG. 9 is bottom up body face detail of the ABS speed sensor bracket of the assembly shown in FIG. 5.

FIG. 10 is a blown up view of circle E of FIG. 9.

DETAILS OF INVENTION

Figure 1:
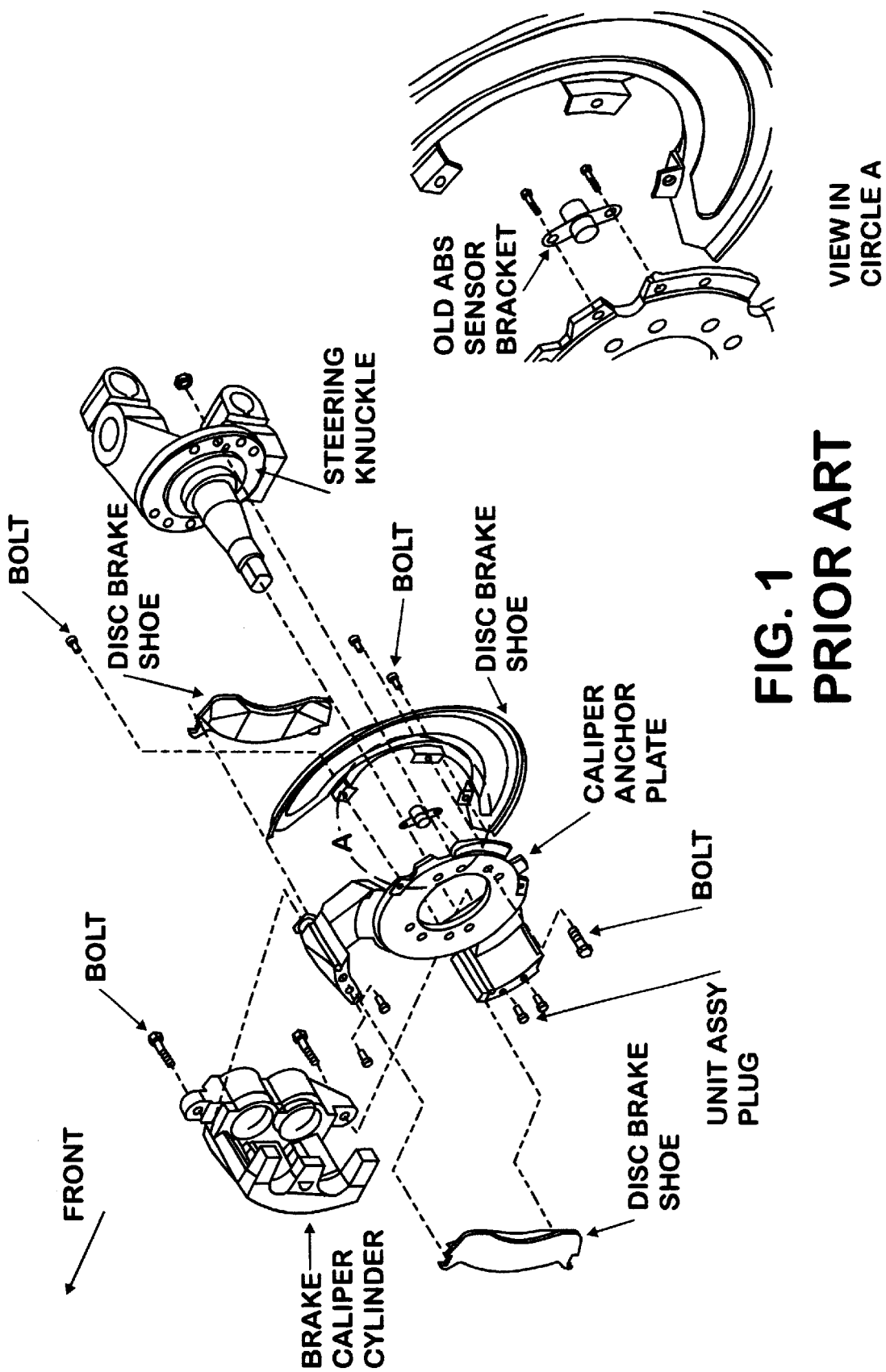
FIG. 1 is an assembly drawing of a prior art anti-lock brake (ABS) speed sensing installation on a front wheel hub steering knuckle.
Figure 2:
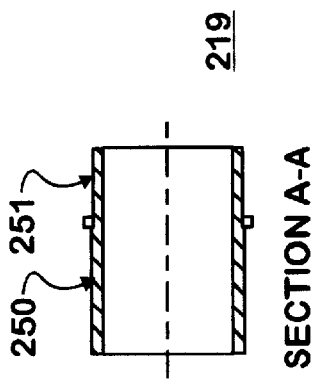
FIG. 2 is a bottom view of a prior art ABS speed sensor bracket of the assembly shown in FIG. 1.
Figure 3:
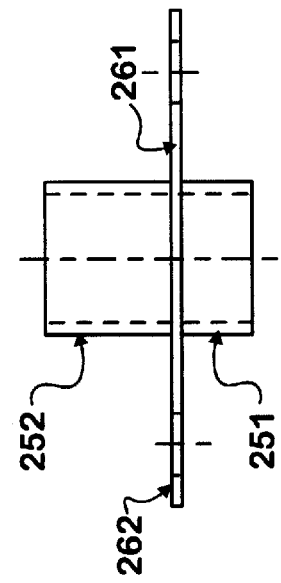
FIG. 3 is a cut away view along line A—A of the ABS speed sensor bracket of FIG. 2.
Figure 4:
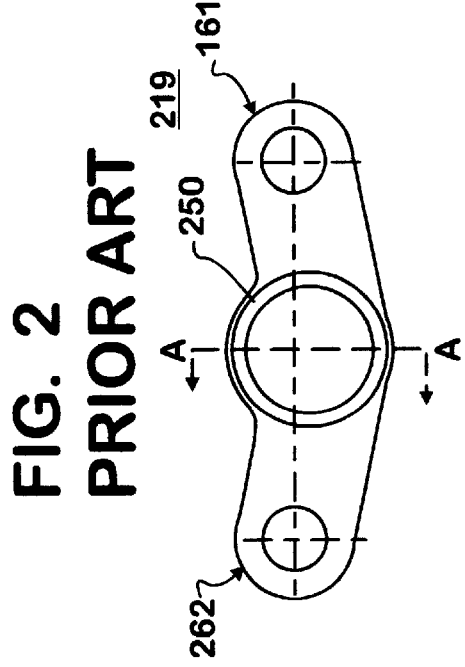
FIG. 4 is a side view of a prior art ABS speed sensor bracket of the assembly shown in FIG. 1.

A system overview of a vehicle 101 with an ABS is shown with its body frame removed in FIG. 1. The vehicle 101 has rear wheels 105 engaged to a rear axle 108 and front wheels 106 engaged to a front axle 107. The axles are rotatably engaged to the vehicle 101. The vehicle has an anti-lock brake (ABS) system generally comprised of an ABS electronic controller 102, at least one ABS wheel speed sensor 103 for each wheel, and ABS modulators 104 used to release wheel brakes or reduce the response of wheel brakes. The ABS speed sensors 103 may sense wheel rotation in a variety of ways. One of these is via magnetic pickup of a reference point or points located on a sensed wheel. The speed sensors 103 detect a wheel revolution each time the reference is sensed. These wheel rotations signals are provided to the ABS electronic controller 102. The electronic controller 102 may subsequently release or vary braking on a particular wheel through the associated ABS modulators 104. It is very important that the speed sensors 103 pickup each revolution. Improper axial position of the speed sensors 103 may result in miss counted wheel rotations and hence less than optimum response of the electronic controller 102.

The ABS speed sensors 103 may be cylindrically shaped as shown or other shapes depending on the manufacturer. There is an ideal axial location parallel to the axles of the vehicle whereby speed sensor pickup is optimized. Where this position is asymmetric relative to mounting location relative to a centerline of the vehicle 101, there is a need for ensuring proper axial location.

Figure 5:
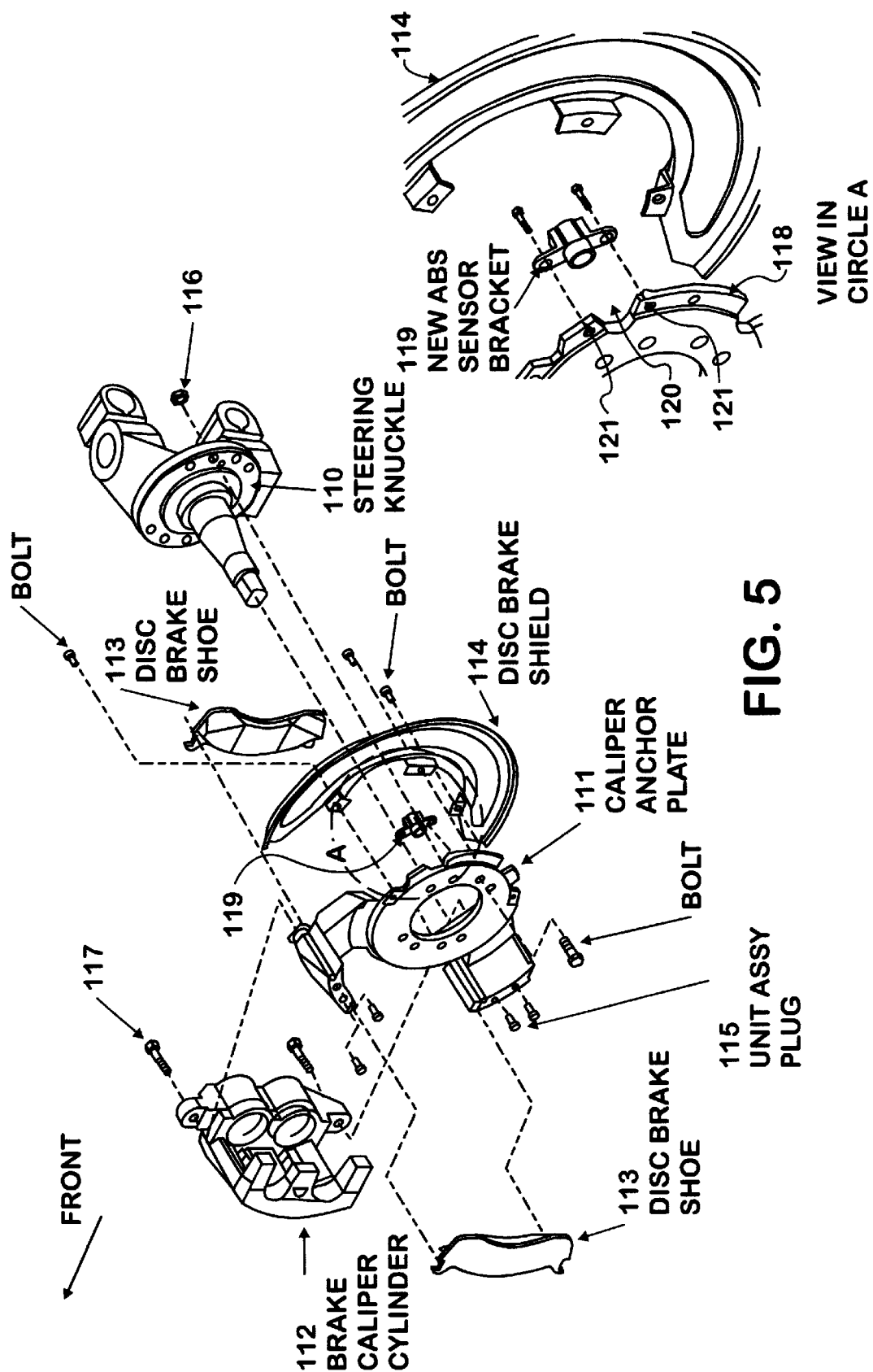
FIG. 5 is a an assembly drawing of a anti-lock brake (ABS) speed sensing installation on a front wheel hub steering knuckle made in accordance with this invention.
Figure 11:
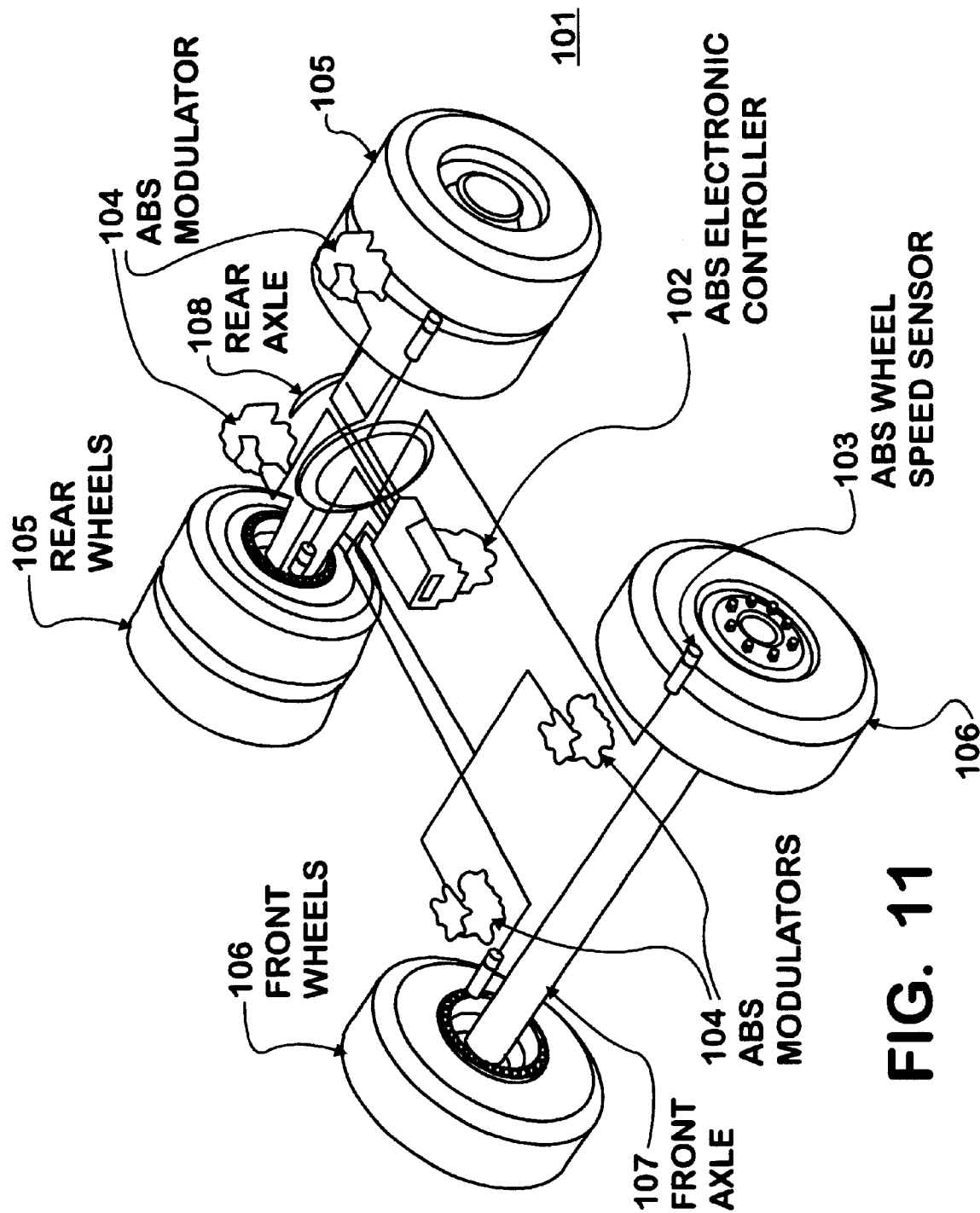
FIG. 11 is a vehicle with an ABS sensor arrangement in accordance with the invention.

One installation of the ABS speed sensor on a wheel is more particularly shown in FIG. 5. A steering knuckle 110 is engaged to each end of the front axle 107. An end of the steering knuckle 110 is engaged to a front wheel 106. There is a caliper anchor plate 111 engaged to the steering knuckle 110. For the rear wheels 105, the caliper anchor plate 111 or similar mounting fixture may be engaged directly or indirectly to a non-rotating element of a chassis of the vehicle 101. The primary purpose of the caliper anchor plate is to hold the brake caliper cylinder 112. The brake caliper cylinder 112 is used to actuate the brake shoes 113, also engaged to the caliper anchor plate 111. A disc brake shield 114 may also be engaged to the caliper anchor plate 111 to protect the brake components from foreign material. The caliper anchor plate 111 contains a radial mounting area with radial outward tabs or engagement areas 118. The engagement areas 118 contain mounting holes 121. The disc brake shield 114 may be engaged to some of these mounting holes 121 of the engagement areas 118 of the caliper anchor plate 111. Between some of the engagement areas 118 are outer edge slots 120 that are generally 'U' or 'V' shaped.

The new improved ABS sensor bracket 119 may be mounted to two of the mounting holes 121 of the engagement areas 118 of the caliper anchor plate 111. The ABS sensors 103 are engaged to sensor receivers 122 of the sensor bracket 119 mechanically and electrically engaged to the electronic controller 102.

The improved ABS sensor bracket 119 is comprised of an ABS sensor receiver 150 and two mounting wing plates 161 and 162. The sensor receiver 150 contains a slot or opening 153 for receiving the ABS sensor 103. Where the sensor 103 is cylindrical, the sensor slot 153 is cylindrical. The wing plates 161 and 162 in combination with the sensor receiver 150 are shaped to correspond with an arc corresponding to the radial mounting area of the caliper anchor plate 111. The sensor receiver 150 is mounted between the wing plates 161 and 162 such that the sensor receiver 150 is asymmetric axially relative to the wing plates 161 and 162 when seen in FIG. 8, and when mounted to the caliper anchor plate 111. When viewed from the side, there is a shorter end 151 of the sensor receiver 150 jutting out a shorter distance from the wing plates 161 and 162 than an opposite longer end 152 of the sensor receiver 150. In one embodiment, a first end of the sensor receiver 150 has a shape that will not fit within the outer edge slot 120 of the caliper anchor plate 111. The holes in the wing plates 161 and 162 will not align with the mounting holes 121 of the engagement areas 118 of the caliper anchor plate 111 to allow engagement. In one embodiment of the ABS sensor bracket 119, this first end has an outer diameter circumference greater than that of the opposite second end. The larger diameter circumference of the first end will not allow both of the holes in the wing plates 161 and 162 to align with both mounting holes 121 of the outer radial area or engagement areas 118 of the caliper anchor plate 111 at the same time. In the embodiment shown in the FIGS. 6 to 10, the shorter end 151 is a second end that then is the only end of the sensor receiver 150 that will mount facing axially outward from the caliper anchor plate 111 and is opposite the first end. This of course may be reversed for different ABS wheel sensors 103, if a different sensor requires its longer end to be outwardly facing to achiever optimum speed sensing of wheel rotation. In the preferred embodiment shown in FIGS. 6 to 10, the second end 151 outer shape is cylindrical and will fit within the outer edge slot 120 of the caliper anchor plate 111. The first end 152 has a unique outer shape that prevents insertion of the first end 152 into outer edge slot 120 to allow alignment of the mounting holes for engagement of both wing plates 161 and 162. On both sides of the sensor receiver 150 there are extruded walls 154 leading outward under the wing plates 161 and 162. Between the extruded walls 154 there may be a concave inner surface 155. Both the extruded walls 154 and the concave inner surface 155 may run from wing plates 161 and 162 to the outer edge of first end 152. The extruded walls 154 impact upon lower lip of the 'U' or ;V' of the outer edge slot 120 should an installer attempt to insert the first end into the outer edge slot 120 between the engagement areas 118 of the caliper anchor plate 111.

The ABS sensor bracket 119 of this invention may be made of as an integrated one piece design when made of a durable light weight powdered metal. There will be no need to weld separate components together due to the strength of the powdered metal. The wing plates 161 and 162 and the sensor receiver 150 will be an integrated piece. While other materials may be used to make an integrated ABS sensor bracket 119, powdered metal is preferred due to its strength and the ability to form the material into the desired shape as described above. This application for an integrated ABS sensor bracket 119 is believed to be a unique application of the powdered metal material.

As described above, the ABS sensor bracket 119, and a vehicle 101 with ABS sensor bracket 119 installed provide a number of advantages, some of which have been described above and others of which are inherent in the invention. Also modifications may be proposed to the ABS sensor bracket 119, and a vehicle 101 with ABS sensor bracket 119 without departing from the teachings herein.

We claim:

1. An anti-lock brake sensor bracket for mounting an anti-lock brake sensor to a vehicle component bracket of a vehicle, the vehicle component bracket having a radial mounting area with a radial engagement areas, the engagement areas contain mounting holes, the radial mounting area having outer edge slots between the engagement areas, the vehicle having at two axles with each axle having at least two wheels engaged to each axle, the axles being rotatably engaged to the vehicle, and the vehicle component brackets each being in close proximity to the wheels to allow sensing of wheel rotation by the anti-lock brake sensors, comprising:

an anti-lock brake sensor receiver engaged to two mounting wing plates;

said sensor receiver containing a slot for receiving an anti-lock brake sensor;

said wing plates in combination with said sensor receiver shaped to correspond with an arc defined by the radial mounting area of the vehicle component bracket;

said sensor receiver asymmetrically engaged between said wing plates axially relative to and when mounted to the vehicle component bracket and when viewed from a side, a shorter end of said sensor receiver juts out a shorter distance from said wing plates than an opposite longer end of said sensor receiver; and a first end of the sensor receiver has a shape that will not fit within the outer edge slot of the vehicle component bracket such that holes in each of said wing plates will not align with the mounting holes of the engagement areas of the vehicle component bracket to allow engagement.

2. The anti-lock brake sensor bracket of claim 1, wherein: said anti-lock brake sensor receiver and said two mounting wing plates are a single integrated piece.

3. The anti-lock brake sensor bracket of claim 2, wherein: said single integrated piece is made of a powdered metal.

4. The anti-lock brake sensor bracket of claim 3, wherein: said first end has an outer diameter circumference greater than that of said opposite second end.

5. The anti-lock brake sensor bracket of claim 4, wherein: a second end of said sensor receiver, opposite said first end, has a cylindrical outer shape and said second end will fit within the outer edge slot of the vehicle component bracket;

said first end has includes extruded walls leading outward adjacent said wing plates;

a concave inner surface between said extruded walls; and both said extruded walls and said concave inner surface run from said wing plates to an outer edge of said first end.

6. The anti-lock brake sensor bracket of claim 5, wherein: said shorter end of said sensor receiver is said first end and said longer end of said sensor receiver is said second end.

7. The anti-lock brake sensor bracket of claim 5, wherein: said longer end of said sensor receiver is said first end and said shorter end of said sensor receiver is said second end.

8. A mobile vehicle, comprising:

a frame with two axles with each axle having at least two wheels engaged to each axle;

said axles rotatably engaged to said frame;

an anti-lock brake electronic controller engaged to said frame;

vehicle component brackets, one for each wheel, each being located on said frame in close proximity to said wheels to allow sensing of wheel rotation by antilock brake sensors;

said vehicle component brackets each having a radial mounting area with radial engagement areas;

said radial engagement areas containing mounting holes and said radial mounting area having outer edge slots between said engagement areas;

an anti-lock brake sensor bracket engaged to each of said vehicle component brackets, each said anti-lock brake sensor bracket comprising:

an anti-lock brake sensor receiver engaged to two mounting wing plates;

said sensor receiver containing a slot for receiving an anti-lock brake sensor;

said wing plates in combination with said sensor receiver shaped to correspond with an arc defined by said radial mounting area of said vehicle component bracket;

said sensor receiver asymmetrically engaged between said wing plates axially relative to said vehicle component bracket and when viewed from a side, a shorter end of said sensor receiver juts out a shorter distance from said wing plates than an opposite longer end of said sensor receiver; and a first end of the sensor receiver has a shape that will not fit within said outer edge slot of said vehicle component bracket such that holes in each of said wing plates will not align with said mounting holes of the engagement areas of said vehicle component bracket to allow engagement; and an anti-lock brake sensor mechanically engaged to each said sensor receiver of each said sensor brackets and each said anti-lock brake sensor electrically engaged to said anti-lock brake electronic controller.

9. The mobile vehicle of claim 8, wherein said vehicle component brackets are brake caliper anchor plates.

10. The mobile vehicle of claim 9, wherein:

said anti-lock brake sensor receiver and said two mounting wing plates are a single integrated piece.

11. The mobile vehicle of claim 10, wherein:

said single integrated piece is made of a powdered metal.

12. The mobile vehicle of claim 11, wherein:

said first end has an outer diameter circumference greater than that of said opposite second end.

13. The mobile vehicle of claim 12, wherein:

a second end of said sensor receiver, opposite said first end, has a cylindrical outer shape and said second end will fit within the outer edge slot of said caliper anchor plate;

said first end has includes extruded walls leading outward adjacent said wing plates;

a concave inner surface between said extruded walls; and both said extruded walls and said concave inner surface run from said wing plates to an outer edge of said first end.

14. The mobile vehicle of claim 13, wherein:

said shorter end of said sensor receiver is said first end and said longer end of said sensor receiver is said second end.

15. The mobile vehicle of claim 14, wherein:

said longer end of said sensor receiver is said first end and said shorter end of said sensor receiver is said second end.

16. The anti-lock brake sensor bracket of claim 1, wherein:

a second end of said sensor receiver, opposite said first end, has a cylindrical outer shape and said second end will fit within the outer edge slot of the vehicle component bracket;

said first end has includes extruded walls leading outward adjacent said wing plates;

a concave inner surface between said extruded walls; and both said extruded walls and said concave inner surface run from said wing plates to an outer edge of said first end.

17. The mobile vehicle of claim 8, wherein:

a second end of said sensor receiver, opposite said first end, has a cylindrical outer shape and said second end will fit within the outer edge slot of said vehicle component bracket;

said first end has includes extruded walls leading outward adjacent said wing plates;

a concave inner surface between said extruded walls; and both said extruded walls and said concave inner surface run from said wing plates to an outer edge of said first end.

* * * * *